UNITED STATES PATENT OFFICE.

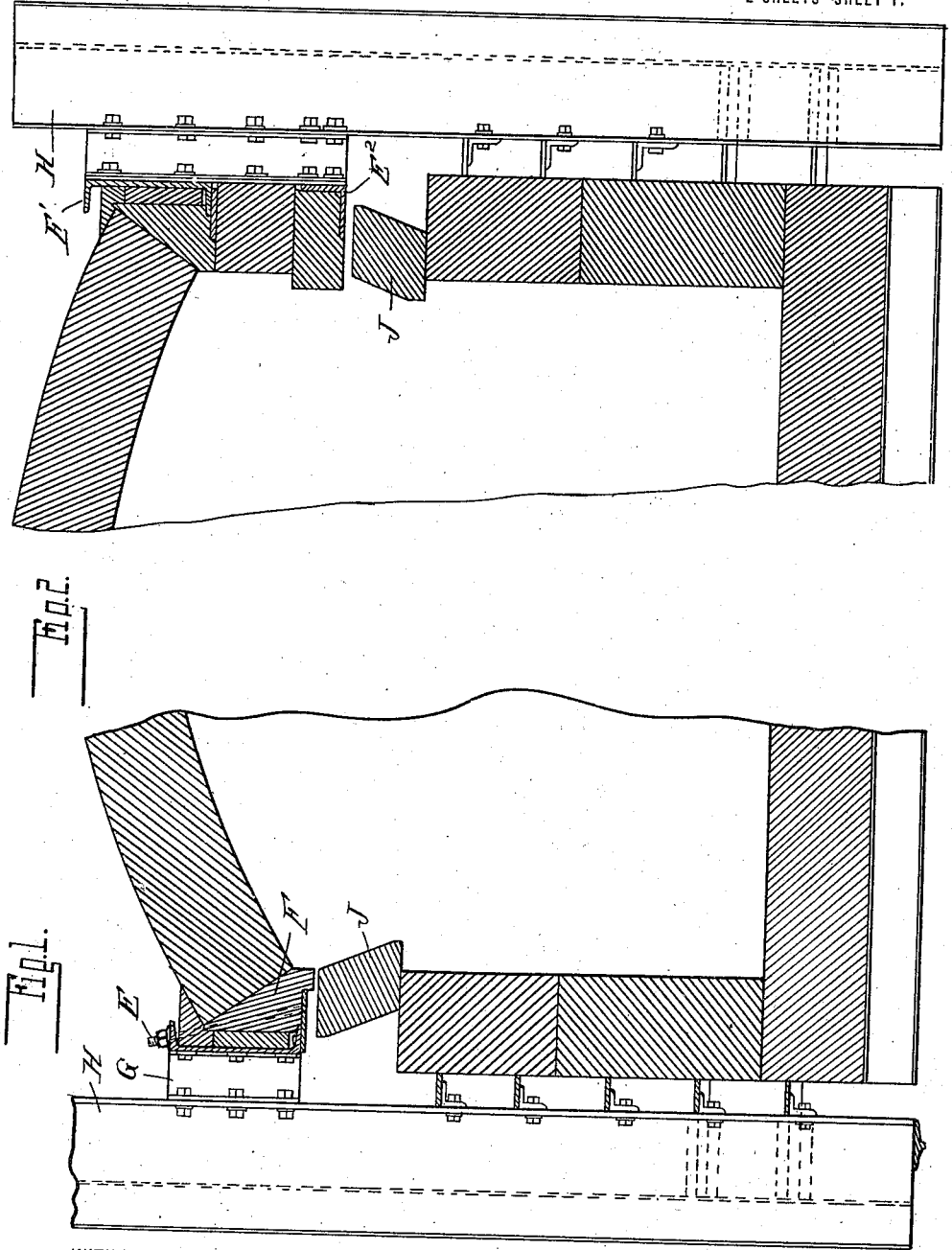

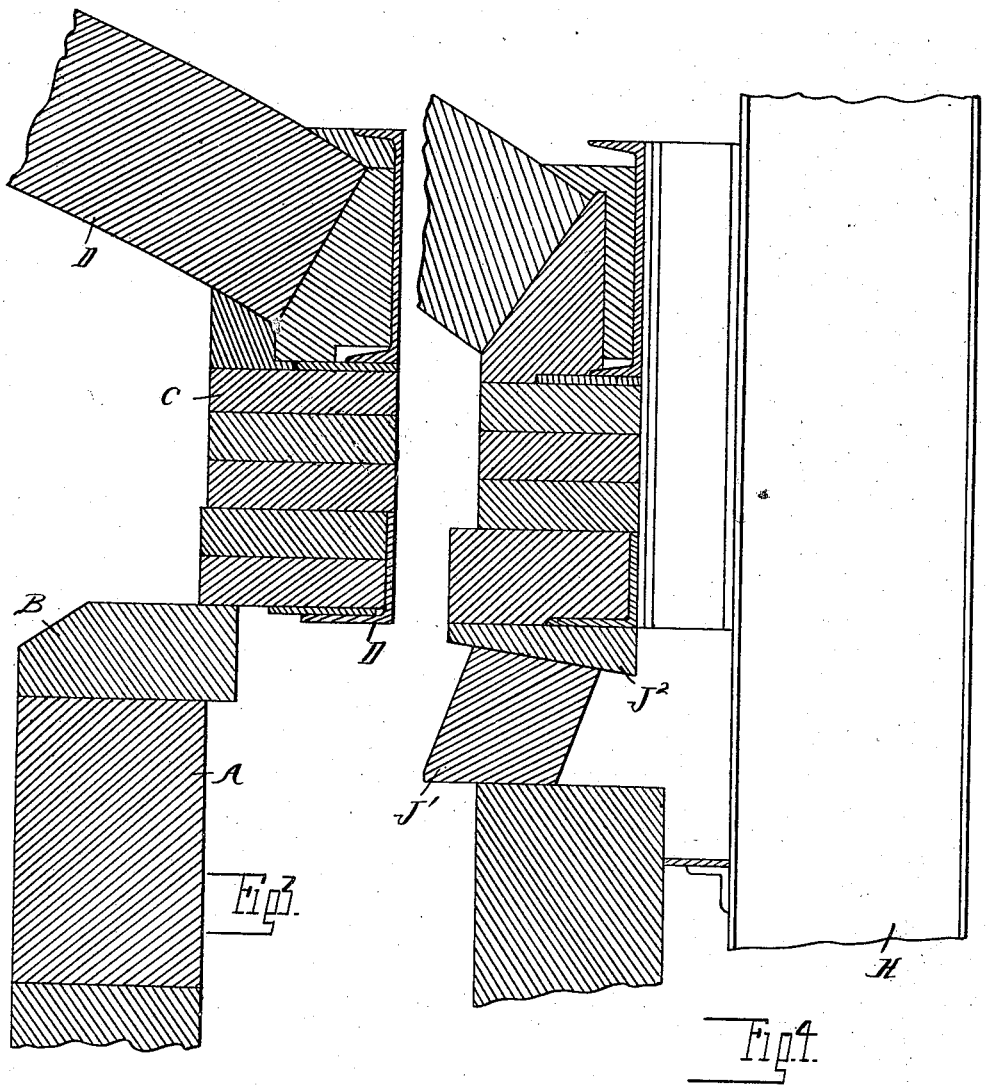

WILLIAM G. BERGMAN, OF TOLEDO, OHIO, ASSIGNOR TO THE TOLEDO GLASS COMPANY, OF TOLEDO, OHIO, A CORPORATION OF OHIO.

GLASS TANK-FURNACE.

1,237,282.

Specification of Letters Patent.

Patented Aug. 21, 1917.

Application filed May 4, 1914. Serial No. 836,311.

*To all whom it may concern:*

Be it known that I, WILLIAM G. BERGMAN, a citizen of the United States of America, residing at Toledo, in the county of Lucas and State of Ohio, have invented certain new and useful Improvements in Glass Tank-Furnaces, of which the following is a specification, reference being had therein to the accompanying drawings.

The invention relates to glass furnaces of the tank form, and it is the object of the invention to produce higher efficiency with less destructive action upon the tank. In the present state of the art it is usual in glass furnace construction to form the tank and furnace chamber of different materials. It is also usual to support the furnace which is above the tank independently of the latter, so that repairs may be made upon the tank without disturbing the furnace. To accomplish this result the walls of the furnace are usually supported upon girders or supporting beams which are arranged outside of the tank walls, said beams in turn being supported by the buck-stays which hold the furnace walls in position. A defect in furnaces of this construction is the destructive action upon the tank wall, which is due to overheating of the upper portion thereof, such overheating being in turn due to the marginal heat in the furnace chamber and the shielding action of the supporting girders upon the outer face of the wall. Thus the circulation of air which lowers the temperature of the outer portion of the tank wall is obstructed by the supporting girders at the very point where the inner portion of the wall is subjected to the most intense heat, and as a result the wasting of the wall at this point is very rapid. With my improved construction I first avoid any shielding of the tank wall upon its outer surface; and second, I avoid overheating the inner portion of the tank wall by diminishing the size of the furnace chamber to be flush with the inner face of the tank wall. This is accomplished without interfering with the independence of the furnace from the tank, and an additional advantage obtained is the conservation of heat due to the smaller chamber.

In the drawings:

Figure 1 is a vertical section through one of the sides of a glass tank and furnace;

Fig. 2 is a similar view showing a modified construction; and

Figs. 3 and 4 are similar views showing still other modifications.

As shown in Fig. 3 A is the wall of the tank, B is the cap or "tuck-stone" for said tank and C is the side wall of the furnace which supports the arch D. This side wall C is shown as arranged outside of the tank wall A, but instead of supporting it upon a girder adjacent to the tank wall a metallic angle bar D is employed for that purpose. This angle bar is arranged with its lower wing flush with the bottom of the wall C and without overlapping to any material extent the tank wall A. The upwardly-extending flange of the angle gives the necessary strength, and this may be attached to the buck-stays (not shown) to support the furnace independent of the tank.

The construction just described, while avoiding the shielding effect on the outer surface of the tank wall is nevertheless open to the objection that the inner face of the wall and the "tuck-stone" are subjected to overheating. This I have avoided in the construction shown in Figs. 1, 2 and 4 by arranging the side walls of the furnace in alinement with the side wall of the tank. As shown in Fig. 1, E is a supporting girder arranged adjacent to the outer face of the furnace wall and supporting the base blocks F of the arch wall D. The girders E are attached by brackets G to the buck-stays H, which stays, in addition to supporting the furnace wall, are used to hold the tank walls in position.

In the construction shown in Fig. 2, the furnace chamber is shown with side walls of greater height, these walls being supported by girders E' and angle bars E², both of which are attached to the buck-stays by brackets or spacers G'.

To fill the space between the bottom of the furnace wall and the top of the tank wall, filler blocks J are placed therein, as shown in Figs. 1 and 2. These are made with sufficient clearance to prevent binding due to expansion of the walls when the furnace is under heat, but the clearance is not large enough to waste any considerable amount of the furnace heat. In the construction shown in Fig. 4, a tight seal is formed between the furnace and the tank, by employing wedge-shaped filler blocks J' and complementary wedge-blocks J², the arrangement being such that when the furnace is being heated the blocks are so adjusted as to avoid binding, and after the furnace has attained heat a relative adjustment of these blocks will completely fill and seal the space.

A furnace constructed as above described more efficient, as all of the heat developed within the furnace chamber is effective upon the glass and is not wasted upon the tank walls. Also the furnace so constructed is longer lived, as overheating of the tank walls is prevented.

What I claim as my invention is:—

1. In a glass furnace, the combination with the tank, of a superposed furnace having side walls substantially flush with the tank walls, a metallic bar or girder for supporting said side walls, buck-stays spaced from the tank walls, and brackets or spacers secured to said buck-stays and supporting bars intermediate the same, the lower sides of said bars and said brackets being substantially flush with the lower sides of said walls.

2. In a glass furnace, the combination with the tank, of a superposed furnace, angle bars for supporting the side walls of said furnace having their lower wings substantially flush with the bottom of said walls, buck-stays from the tank walls, brackets or fillers between said buck-stays and angle bars and connected thereto, and means for filling the space intermediate said furnace and tank walls.

3. In a glass furnace, the combination with the tank, of a superposed furnace, means for supporting the furnace wall independent of the tank wall, and filler blocks between said tank wall and furnace wall comprising reverse wedges adjustable to completely fill the space.

In testimony whereof I affix my signature in presence of two witnesses.

WILLIAM G. BERGMAN.

Witnesses:
T. H. MILLER,
S. E. EICHMAN.

Copies of this patent may be obtained for five cents each, by addressing the "Commissioner of Patents, Washington, D. C."